United States Patent [19]
Rosser

[11] Patent Number: 5,409,339
[45] Date of Patent: Apr. 25, 1995

[54] U-BOLT CLAMPING MECHANISM

[76] Inventor: Richard H. Rosser, 591A Key Senter Rd., Jackson, Tenn. 38305

[21] Appl. No.: 143,626

[22] Filed: Nov. 1, 1993

[51] Int. Cl.[6] .......................... F16B 23/00; F16B 35/06
[52] U.S. Cl. ..................................... 411/400; 411/405; 411/919
[58] Field of Search ............... 411/400, 401, 402, 405, 411/919; 269/242, 243

[56] References Cited

U.S. PATENT DOCUMENTS

| | | | |
|---|---|---|---|
| 140,404 | 7/1873 | Coe | 269/242 X |
| 838,554 | 12/1906 | Lasance | 269/242 X |
| 2,422,841 | 6/1947 | McClain | 411/400 |
| 3,002,414 | 10/1961 | Nelson | 411/405 |
| 4,079,487 | 3/1978 | Coop, Sr. | 411/400 X |
| 4,685,848 | 8/1987 | Langer | 411/402 |

Primary Examiner—Neill R. Wilson

[57] ABSTRACT

The invention consists of two gear teethed nuts meshed together in an arrangement that causes both the nuts to move at the same rate of speed and in the same direction up or down the threaded rod arms of a U-bolt clamp whenever one of the nuts is turned. The meshed nuts apply similar and simultaneous pressure upon the crosspiece of a U-bolt clamp which crosspiece moves relative to the threaded rod arms which transverse it through apertures in the crosspiece. A clampling force is achieved between the crosspiece and the curved portion of the U-bolt as the two members are forced together by movement of the meshing nuts turning upon the threaded rod arms and pressing against the crosspiece.

1 Claim, 1 Drawing Sheet

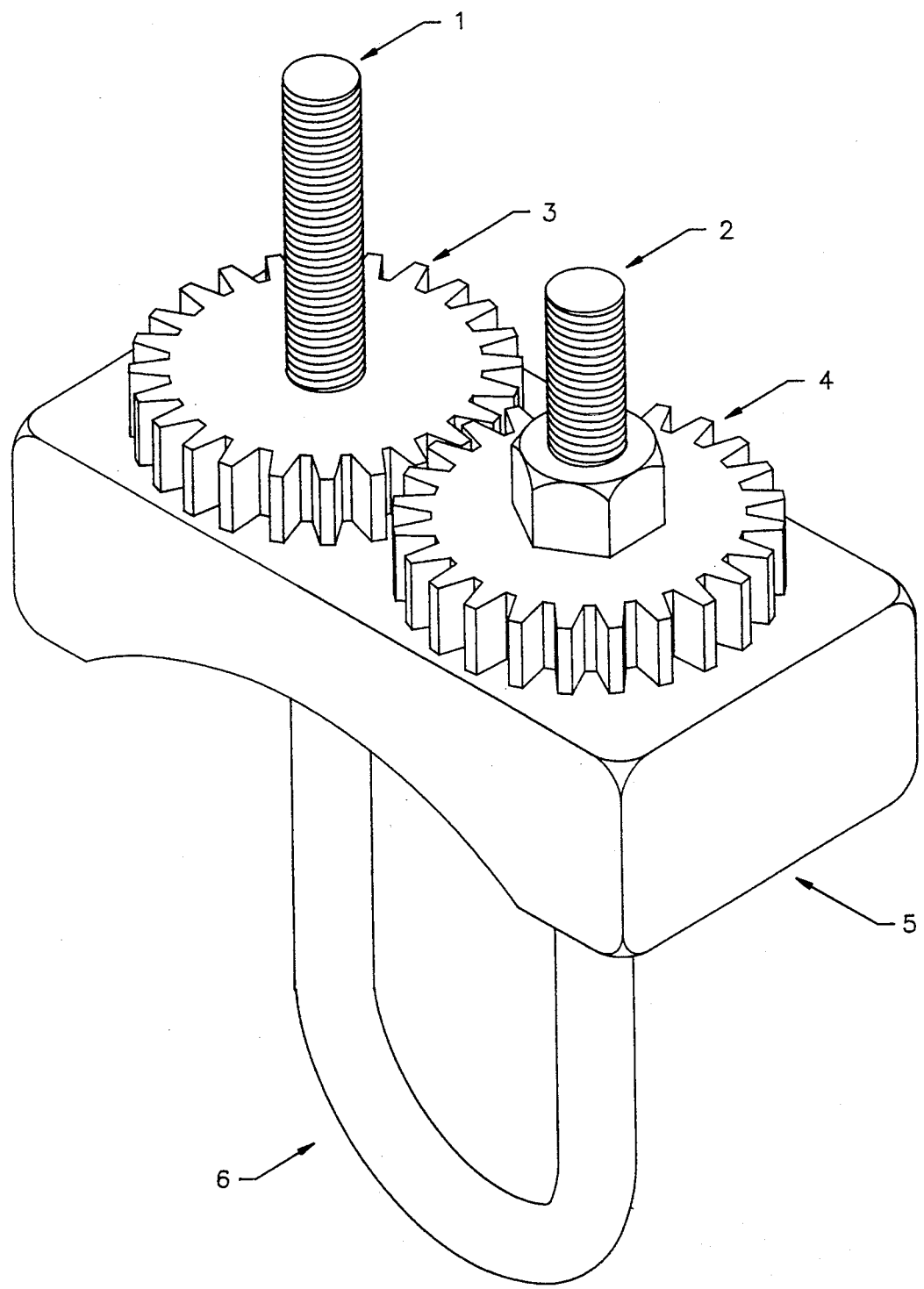

U-BOLT CLAMPING MECHANISM

BRIEF SUMMARY OF THE INVENTION

The commonly used U-bolt clamp consists of a rod threaded on end each end and bent in the shape of the letter 'U', a crosspiece with apertures through which the rod arms transverse the crosspiece, and nuts which are threaded onto the rod arms and apply pressure to the crosspiece as they are rotated in a clockwise direction. The clamping force is accomplished between the curved portion of the U-bolt and the crosspiece.

U-bolts are used dozens of feet above the ground on cables, in and around machinery, under buildings and in many places difficult to reach. It is desirable that a U-bolt be tightened or loosened quickly and efficiently. One of the disadvantages of the commonly used U-bolt is that its two nuts must be tightened separately and alternately. Several applications of force applied alternately to the nuts may be necessary to draw the U-bolt uniformly through the crosspiece and cause a clamping action.

The present invention provides a simple and easy way to tighten or loosen a U-bolt. As the drive nut is turned the other nut also turns and moves at the same rate of speed along its threaded rod arm. The arms of the U-bolt are drawn through the crosspiece at equal rates of speed. The present invention makes it unnecessary to apply torque alternately to the nuts to move the U-bolt uniformly through the crosspiece. This invention requires that a socket be applied to a nut only once to tighten or loosen the U-bolt.

BRIEF DESCRIPTION OF THE DRAWING

The enclosed drawing is a perspective view of the invention which shows the right hand threaded gear teethed nut and hex head fitting, the left hand threaded gear teethed nut, the crosspiece, and the U-bolt.

DETAILED DESCRIPTION OF THE INVENTION

The present invention looks very much like the commonly used U-bolt. It consists of a threaded 'U' shaped rod 6. It has a crosspiece 5 which runs transverse to the rod arms 1 & 2, and through which the U-bolt rod arms extend. It has a nut on each threaded rod arm which is used to apply pressure against the crosspiece and draw the U-bolt rod arms through it. Drawing the U-bolt through the crosspiece closes the space between the crosspiece and curved portion of the U-bolt, thus providing a clamping function.

However, the present invention is significantly different from the common U-bolt in the following ways:

(1) The gear teethed nuts ( henceforth referred to as gearnuts in this invention description ) are teethed on their outer peripheries and they are meshed with each other. One of the gearnuts 4 utilizes a hex head fitting or other device designed to facilitate the application of a wrench or socket. The teeth of one gearnut match the teeth of the corresponding gearnut. The drive gearnut 4 has right hand threads. The driven gearnut 3 has left hand threads.

(2) One arm of the U-bolt is left hand threaded 1, and it is longer by a length equal to the thickness of its gearnut to facilitate the initial placement of the gearnuts in mesh with one another on the rod arms. The other rod arm 2, on which the drive gearnut turns, is right hand threaded.

Variously shaped crosspieces may be used in conjunction with the invention depending upon the articles to be clamped, and the shape of the crosspiece is not an objective of patent protection.

While the invention has been described and illustrated in its simplest comprehension as a U-bolt clamp utilizing two gearnuts in mesh with one another it is manifest that similar principles of operation and design may be used to construct U-bolt clamps having the gearnuts indirectly meshed with one another by means of one or more spur gears mounted on the crosspiece between the gearnuts.

What is claimed as new is:

1. A gear driven nut system within a U-bolt, which system has a nut threaded around one rod arm of a U-bolt, said nut having gear teeth around its outer periphery, which gear teeth are in engagement with the gear teeth of a complimentary nut which has gear teeth around its outer periphery and which complimentary nut is threaded around the other rod arm of the U-bolt, and which system of nuts is in the place of the two independently rotatable nuts of the common U-bolt.

* * * * *